UNITED STATES PATENT OFFICE.

RUDOLF DRAWE, OF SAARBRÜCKEN, GERMANY, ASSIGNOR TO EHRHARDT & SEHMER, GESELLSCHAFT MIT BESCHRÄNKTER HAFTUNG, OF SAARBRÜCKEN, GERMANY.

PROCESS FOR THE PRODUCTION OF NITRIC OXIDS IN INTERNAL-COMBUSTION ENGINES.

1,283,112. Specification of Letters Patent. Patented Oct. 29, 1918.

No Drawing. Application filed November 26, 1915. Serial No. 63,691.

*To all whom it may concern:*

Be it known that I, RUDOLF DRAWE, a subject of the Emperor of Germany, and residing at Saarbrücken, in the Empire of Germany, have invented certain new and useful Improvements in Processes for the Production of Nitric Oxid in Internal-Combustion Engines, of which the following is a specification It is generally known that at high temperatures and high pressures, the nitrogen and the oxygen in the atmosphere unite to form a chemical compound, i. e., nitric oxid; and it has been proposed to ignite a mixture of air and gas in a closed combustion space to produce this compound. The importance of avoiding decomposition of the nitric oxid so formed has also been recognized, and it has been proposed to employ, for this purpose, a quick fall of the pressure, as well as of the temperature. Attempts have been made to utilize, for the combustion space under pressure, the cylinders of internal combustion engines, in order to make use of the work produced by the increase of pressure which takes place therein. But no practically useful result has been obtained, because the internal combustion engines, as ordinarily constructed, proved unsuitable for the requirements of the thermo-chemical process in question.

Experiments have shown that the waste gases of the ordinary combustion engine contain either no nitric oxid at all, or else contain only small traces of it, the reason being that the engine is constructed according to the requirements of a thermically useful generation of power, which necessarily involves a high compression, a great excess of air, and as low a temperature as possible during the cycle.

The advantages of low temperatures for thermic efficiency are consequences, first, of the increase of the specific heat, and second, of the rapid growth of the cooling water losses at rising temperatures. Accordingly in driving internal combustion engines, it is advisable to employ mixtures with but a small proportion of gas, but to compress such mixtures as highly as possible; and, further, to obtain as low temperatures as possible throughout the entire cycle of operations.

On the other hand, if the internal combustion engine is to be used essentially for the production of nitric oxid, the carrying out of this thermo-chemical process renders necessary a complete deviation from the theoretical requirements of the thermo-mechanical process as described above. Instead of the preliminary conditions for thermic efficiency, the preliminary conditions for chemical efficiency must first of all be paid attention to, the two types of internal combustion engines having in common only the requirement that the internal combustion engine which shall work economically with the chemical process shall be designed to produce power.

For the chemical process are required: as high temperatures as possible; their duration for a definite time which, preferably, should be equal to the time necessary for the formation of nitric oxid; and, in addition to the highest temperature, as rapid as possible a fall of temperature in order to limit the decomposition of the nitric oxid formed.

As these requirements cannot be realized in the ordinary internal combustion engine as at present operated, it is absolutely necessary, therefore, to develop another and more appropriate mode of operation; and it is the object of the present invention to provide an improved method or process, in order to effect the desired production of the nitric oxid in the engine, of which the most important feature is the utilization of the maximum amount of either the physical or the chemical heat of the working mixture, or of both, irrespective, however, of the addition of oxygen as practically required for the formation oxygen of the nitric oxid.

The gaseous contents of the cylinder consist of the combustible mixture and of the excess of air as necessary for the formation of the nitric oxid; but instead of air, or as substitute for a part of it, oxygen may be made use of, provided, however, that the nitrogen be added either with the mixture or in some other suitable way.

The temperature is the higher, the greater the amount of chemically bound heat that is conducted into the cylinder in the mixture; that is to say, the richer and purer the mixture is, and the smaller the excess of air is which is necessary to obtain a complete combustion. The chemical heat may, however, be partially replaced, or in other words, the total quantity of heat may be increased, by the addition of physical heat; for example, by heating the mixture, either before or after its entrance into the cylinder. The maximum temperature with respect to the chemical heat is obtained by means of mixtures having as great a calorific effect as possible, and, also, by means of a high temperature at the end of the compression period, viz. nearly up to the point where self-ignition takes place, the limit being reached when the engine works with self-ignition.

The physical heat is preferably obtained by utilizing, for pre-heating the mixture, that heat which otherwise would be lost; and for that purpose the heat passing through the cylinder walls and thus into the cooling water may be used, as well as the heat of the exhaust gases. In the first case, it is sufficient to cool the cylinder to a less extent, or even not to cool it at all; but in some cases heating of the compression space also, for instance by means of the exhaust gases, may prove advantageous.

Utilizing the exhaust gases for the pre-heating is preferably effected in heat-exchange apparatus; but the addition of heat to the mixture may also be brought about by retaining a part of the hot exhaust gases within the cylinder, in which, it is advisable that the highest possible exhaust temperatures should be obtained in order to reduce the amount of spent gases used to a minimum, such temperatures being produced either by lessening the cooling of the cylinder, or by throttling the exhaust port, that is to say, by changing the exhaust pressure or tension. A still further method of increasing the amount of physical heat of the mixture, consists in injecting appropriate quantities of highly-heated gas, air, or steam into the mixture during compression.

In order to increase the amount of chemical heat in proportion to the volume, it is important to remove from the cylinder the exhaust gases remaining therein, and to replace them by an appropriate quantity of fresh mixture, which may be effected by scavenging with either cold or hot air, the former being advantageous in that the temperature of the cylinder wall is reduced, with the result that the possibility of a preliminary explosion is diminished; while at the same time, the temperature at the end of the compression may be correspondingly higher. The amount of the chemical heat of the mixture may also be increased by the addition either of oxygen to the air used for the mixture, or of vaporized or atomized oil, or its equivalent, to the gas if a poor gas must be employed; and its increase may likewise be effected by conducting the combustible mixture under pressure into the cylinder.

The higher temperatures of the thermo-chemical process necessitate greater losses of heat to the cooling water than are met with in the thermo-mechanical process heretofore in use; but these losses are diminished if the combustion pressure is kept low, because the giving off of heat of the mixture increases with the pressure. In order, however, to obtain the high temperature required for the formation of the nitric oxid, viz., temperatures that are characterized by the increased pressure at the dead point, the compression space must be so large that at least a three-fold increase of pressure may be effected by the combustion. On the other hand, the combustion space will become too large, and the expansion curve, in consequence, too flat, if the combustion pressure is to be kept low, while the mixture is subjected to very high heat, so that by reason of the diminution of the losses to the cooling water, a high temperature is obtained, the losses being increased in such event by reason of the decomposition of the nitric oxid formed. This, however, may be obviated by commencing compression below atmospheric pressure, whereby the compression space may be smaller but the temperature at the end of the compression may be kept at the desired height. The same effect may be also obtained by keeping the inlet valve open after the dead point is reached, and during a portion of the compression stroke, so that part of the mixture is not compressed.

For a successful utilization of the heat, it is necessary that combustion be completed when the highest temperature is reached. A perfect, suddenly-finished combustion entails highest temperatures and a quick fall of the same; it facilitates the formation of the nitric oxid and limits its decomposition; and it may be attained by a thorough mixing of the gas and the air, the mixing becoming more perfect if the particles of the mixture are forcibly whirled through one another, for instance if a part of the mixture, i. e., gas or air or even steam in a heated state be injected into the other part. The pre-heating of the mixture is valuable also with respect to quick and complete combustion, because a good mixture pre-heated up to the point of self-ignition will burn immediately after ignition commences down to and into even the most remote corners of the combustion space, and in a perfectly uniform manner.

Considering the time of formation of the nitric oxid, which depends upon the temperatures attained, the expedients above described will be employed either singly or in certain appropriate combinations, as may appear practical in view of the kind of gas employed, the number of revolutions of the engine, or other conditions.

In the case of high-speed engines, it may happen that the times for the formation of the nitric oxid, at normal working conditions, are too short; and in such a case it is advisable to increase the length of the time during which the temperature has the height necessary for the formation of the nitric oxid by introducing mixture parts of high calorific effect after ignition has taken place, i. e., in the manner carried out in the uniform pressure process. This procedure is likewise especially advantageous in connection with slow-speed engines if, in consequence of the application of poor gases, very high temperatures cannot be attained and thus the times for the formation of the nitric oxid become rather long.

The fall of temperature necessary, after the formation of the nitric oxid, to diminish its decomposition, may be accelerated by the addition of special spaces to the cylinder, which are brought into communication with the interior of the cylinder just at the proper moment, and into which the gas quickly expands, thus producing a sudden fall of pressure which entails the fall of temperature required. The same result may also be obtained by subjecting the mixture, during expansion, to the action of a cold jet of air or gas, which thoroughly whirls the particles of the mixture about, so that the transfer of heat to the cylinder wall is accelerated and all particles of the mixture are brought in contact with the heat-absorbing inner surfaces of the same.

I claim as my invention:—

1. The herein-described method of producing nitric oxid in internal combustion engines, which consists in preheating the combustible mixture, together with an excess of gaseous fluid to form the nitric oxid, by means of the exhaust gases, in order to increase the amount of heat of the mixture in proportion to its volume; maintaining the high temperature of the mixture up to the end of the compression period, to effect the formation of the nitric oxid, combustion being completed when the highest temperature is reached; and effecting a rapid fall of temperature immediately thereafter, to diminish the decomposition of the nitric oxid formed.

2. The herein-described method of producing nitric oxid in internal combustion engines, which consists in preheating the combustible mixture, together with an excess of gaseous fluid to form the nitric oxid, by means of the exhaust gases, in order to increase the amount of heat of the mixture in proportion to its volume; maintaining said exhaust gases at a maximum temperature; maintaining the high temperature of the mixture up to the end of the compression period, to effect the formation of the nitric oxid, combustion being completed when the highest temperature is reached; and effecting a rapid fall of temperature immediately thereafter, to diminish the decomposition of the nitric oxid formed.

3. The herein-described method of producing nitric oxid in internal combustion engines, which consists in injecting a highly-heated, gaseous fluid into the combustible mixture, to thoroughly mix together the particles of the mixture, and to increase the heat of the latter in proportion to its volume; maintaining the high temperature of the mixture up to the end of the compression period, to effect the formation of the nitric oxid, combustion being completed when the highest temperature is reached; and effecting a rapid fall of temperature immediately thereafter, to diminish the decomposition of the nitric oxid formed.

In testimony whereof I affix my signature in presence of two witnesses.

RUDOLF DRAWE.

Witnesses:
  WERBIK WENZL,
  C. INNESS BROWN.